Dec. 6, 1966 K. WILFERT 3,290,088
VEHICLE CONSTRUCTION
Filed Jan. 16, 1964
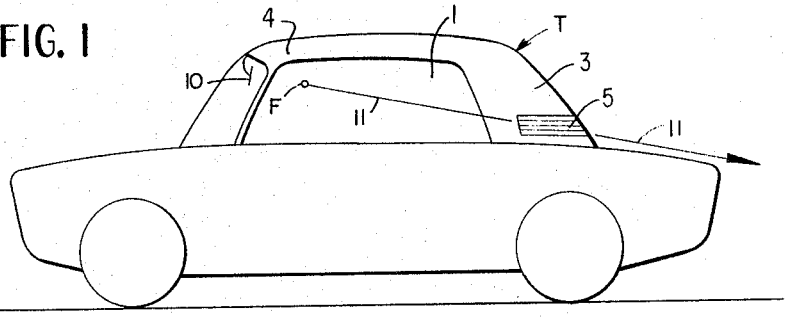
FIG. 1
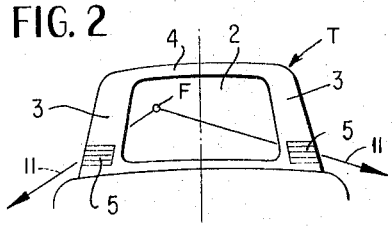
FIG. 2
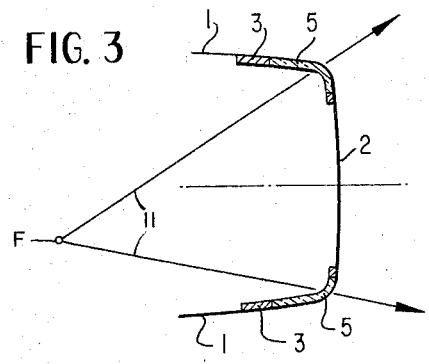
FIG. 3
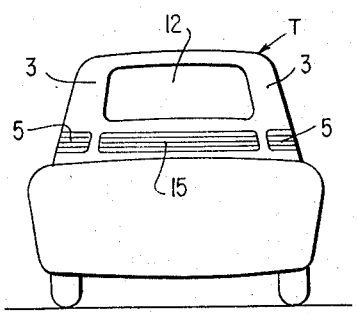
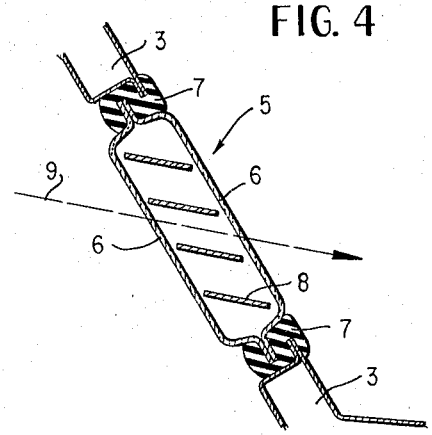
FIG. 4
FIG. 5
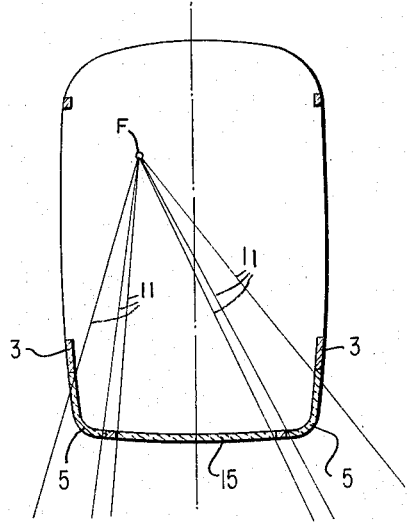
FIG. 6
INVENTOR.
KARL WILFERT
BY *Dicke & Craig*
ATTORNEYS.

United States Patent Office 3,290,088
Patented Dec. 6, 1966

3,290,088
VEHICLE CONSTRUCTION
Karl Wilfert, Gerlingen-Waldstadt, Germany, assignor to Daimler-Benz Aktiengesellschaft
Filed Jan. 16, 1964, Ser. No. 339,270
Claims priority, application Germany, Jan. 16, 1963, D 40,694
6 Claims. (Cl. 296—137)

The present invention relates to a motor vehicle, especially a passenger motor vehicle, having a top containing a transparent window.

The aim to improve the visibility conditions for the driver of a motor vehicle has led heretofore to a continuous increase in the transparent windows within the vehicle top and especially to the development of panoramic windowpanes. The enlargement of the windowpanes, however, is connected with various disadvantages. Large windowpanes and especially panoramic windowpanes are not only relatively expensive but also require a weakening of the roof columns and therewith a reduction of the roof rigidity. In case of accidents in which a vehicle rolls over, the roof rigidity of a vehicle is, however, of decisive significance for the protection of the passengers. Moreover, there also exists the disadvantage that the known large windows not only permit a good visibility toward the outside from within the vehicle but also permit an unimpaired vision or insight into the vehicle so that the passengers are in no way protected against recognition.

The present invention is based on the aim to eliminate all these disadvantages, which have been accepted heretofore for the realization of good visibility conditions, and to produce a vehicle in which the requirements for a high roof rigidity, low manufacturing cost, and a protection against recognition, especially for the passengers in the rear seat of the vehicle, are fulfilled and which nevertheless assures an adequate visibility for the driver, especially toward the rear of the vehicle. This aim is solved in accordance with the present invention by arranging and providing, in addition to the transparent windows kept intentionally relatively small, separate fields of visibility or fields of vision in those parts of the vehicle top which otherwise would restrict the angle of vision out of the passenger space in a manner that would imperil and endanger the traffic. These fields of visibility may consist appropriately of inserted, transparent windowpanes.

According to a further feature and development of the present invention, the fields of visibility may be provided with louvers or Venetian blinds that are then so arranged that, though they do not impair the visibility from within the passenger space toward the outside in the desired direction of vision, they do not permit a viewing of or insight into the vehicle from the outside thereof. It is thereby appropriate if the fields of vision are provided with double windowpanes and the louvers or Venetian blinds are arranged between the panes. The arrangement of the louvers or Venetian blinds becomes particularly simple if the slats of the louvers or Venetian blinds are rigidly arranged parallel to the direction of vision.

In order to assure good visibility conditions, the fields of vision in accordance with the present invention may be arranged, for example, within the area of the lower and/or upper edge of individual transparent windows and may complete these windows so to speak. However, the fields of vision in accordance with the present invention may also be inserted into roof columns or the like within the area between adjacent transparent windows. It is further possible to arrange fields of vision around the vehicle top to a lesser or greater extent.

Accordingly, it is an object of the present invention to provide a vehicle top of the type described hereinabove which eliminates the shortcomings and drawbacks encountered with the prior art constructions by simple and inexpensive means.

It is another object of the present invention to provide a vehicle top which obviates the need for large panoramic windows or large windowpanes yet assures adequate visibility to the driver, especially toward the rear of the vehicle.

Another object of the present invention resides in the provision of a vehicle top disposing with the necessity of large windowpanes and thereby reducing the cost of manufacture and installation without sacrifice to sufficiently good visibility for the driver.

Another object of the present invention resides in the provision of a vehicle top for passenger motor vehicles which assures a good rigidity of the roof without sacrificing good visibility, particularly to the rear of the vehicle and without involving expensive and large windowpanes.

Still another object of the present invention resides in the provision of a vehicle top offering a high sturdiness and rigidity for the safe protection of the passengers in case of accident without, however, impairing good visibility for the driver.

Still a further object of the present invention resides in the provision of a vehicle top which permits a good visibility from within the passenger space toward the outside of the vehicle while at the same time increasing the privacy of the passengers, especially those seated in the rear seats.

Still another object of the present invention resides in the provision of a vehicle top which brings into harmony the contradictory requirements for a vehicle top of high roof rigidity, low manufacturing costs, and privacy for the passengers as well as good visibility for the driver.

A further object of the present invention resides in the provision of a vehicle top having relatively small transparent windowpanes complemented by fields of vision fulfilling the aforementioned aims and objects in a most appropriate and effective manner.

These and other objects, features and advantages of the present invention will become more obvious from the following description when taken in connection with the accompanying drawing which shows, for purposes of illustration only, two embodiments in accordance with the present invention, and wherein FIGURE 1 is a side elevational view of a passenger motor vehicle in accordance with the present invention;

FIGURE 2 is a partial rear elevational view of the top of the motor vehicle of FIGURE 1;

FIGURE 3 is a partial horizontal cross-sectional view through the top of the motor vehicle of FIGURE 1, taken at the height of the inserted fields of vision, FIGURE 4 is a vertical cross-sectional view through one of the fields of vision in accordance with the present invention;

FIGURE 5 is a rear elevational view of a modified embodiment of a passenger motor vehicle in accordance with the present invention; and FIGURE 6 is a horizontal cross-sectional view through the top of the motor vehicle of FIGURE 5, taken at the height of the additional fields of vision.

Referring now to the drawing wherein like reference numerals are used throughout the various views to designate like parts and more particularly to FIGURES 1 to 3, there is shown a passenger vehicle having a superstructure or top T. The top T comprises a roof 4, and a vertical wall portion having transparent side windows 1, a rear window 2 and rear roof columns 3, arranged in a conventional manner. The horizontal dimension of each roof column 3 is quite large and therefore, the horizontal dimensions of the transparent side windows 1 and rear window 2 are relatively small. This offers the advantage that very wide roof columns 3 extending up to the rear wall of the top of the motor vehicle remain, which impart a high rigidity to the roof 4 of the vehicle. Additionally, the cost of the window panes, especially for the transparent rear window 2 are considerably decreased. Finally, the passengers in the rear seat of the vehicle are protected against recognition from the outside in a far-reaching manner by the projecting roof columns.

In order to assure, preferably to the driver whose eyes are normally located at point F, good visibility conditions also toward the rear, notwithstanding such relatively small windows, separate fields of visibility 5 are inserted in connection with the vehicle according to FIGURES 1 to 3 in the lower area of the roof columns 3 which open up or free to the driver the view toward the rear in a downwardly inclined direction so that the driver is able to view and survey easily also in the rearward direction the dimensions of his vehicle and the space remaining available for maneuvering. In a conventional manner, the driver may look to the rear by either facing the rear or looking through mirror 10. For purposes of illustration, lines 11 represent possible lines of sight for a driver facing the rear of the vehicle. There would be similar lines of sight if the driver looked through the mirror 10.

As shown more clearly in FIGURE 4, the fields of vision or fields of visibility 5 consist of transparent windowpanes 6 which are inserted by means of the usual window seal elements 7 into an aperture of the corresponding vehicle part, that is, of the roof columns 3 in the illustrated embodiment. The transparent panes 6 are provided with off-set rims and are composed into double panes in such a manner that they define therewithin a hollow space in which is arranged a louver or Venetian blind 8. The individual slats of the Venetian blind 8 are arranged parallel to the direction of vision 9 parallel to the corresponding line of sight shown in the other figures and are therefore inclined outwardly downwardly. The slats of the Venetian blind 8 therefore barely appear or become noticeable to the driver of the vehicle. Since the eyes of an observer on the outside of the motor vehicle are generally disposed much higher than the fields of vision 5, his looks or views arrive at the slats of the Venetian blind 8 at a considerable angle so that they prevent an insight into the vehicle.

In the embodiment of the vehicle according to FIGURES 5 and 6, the size of the rear window 12 is also reduced in the height thereof. In order to compensate for the loss in the angle of vision resulting therefrom, there is arranged below the rear windowpane 12 a field of vision 15 which is as wide as the rear window 12. This separate field of vision 15 is continued in the direction toward the sides by fields of vision 5 which are arranged, as with the passenger motor vehicle according to FIGURES 1 to 3, in the roof columns 3 of the vehicle. The field of vision 15 is also constructed appropriately in the manner illustrated in FIGURE 4. FIGURE 6 shows that the driver of the vehicle constructed according to the FIGURE 5 embodiment has an almost unlimited or unrestricted field of vision toward the rear provided by the fields of vision 5 and 15 in combination with the rear window 12.

While I have shown and described two embodiments in accordance with the present invention, it is understood that the same is not limited thereto but is susceptible of numerous changes and modifications within the spirit and scope thereof as known to a person skilled in the art. Separate fields of vision according to the present invention may be accommodated in a similar manner in station wagons, small buses or the like. Particularly with such types of vehicles, it may be appropriate to arrange the fields of vision round about the vehicle top. Furthermore, it is possible within the scope of the present invention to accommodate such additional fields of vision also within the area of the upper edge of the transparent windowpanes.

Thus, it is obvious that the present invention is not limited to the details shown and described herein but is susceptible of numerous changes and modifications as known to a person skilled in the art; and I, therefore, do not wish to be limited to the details shown and described herein but intend to cover all such changes and modifications as are encompassed by the scope of the appended claims.

I claim:
1. A motor vehicle, especially a passenger motor vehicle, comprising:
    a vehicle top including roof columns and a roof supported by said columns,
    said vehicle top including substantially rigid non-transparent material obstructing the vision of the driver and transparent window means which are relatively small including generally longitudinally extending side windows and a generally transversely extending centrally located rear window to leave relatively large wide non-transparent rear roof corner columns and therewith provide a high degree of roof rigidity,
    and means forming separating fields of vision substantially smaller than each of said rear and side windows provided in those parts of the non-transparent vehicle top which otherwise would restrict the angle vision out of the vehicle interior space in a detrimental manner to the traffic,
    the fields of vision being arranged in the roof columns within the area between two adjacent window means, the geometric center of said fields of vision being vertically spaced from the geometric center of said rear window a substantial distance, the lowermost portions of said fields of vision extending below the lowermost portion of said rear window, the uppermost portions of said fields of vision being substantially below the geometric center of said rear window, and each of said roof columns above said fields of vision essentially consisting of non-transparent rigid material.

2. A motor vehicle, especially a passenger motor vehicle, according to claim 1, including an additional field of vision having its geometric center spaced below and generally vertically aligned with the geometric center of said rear window.

3. The motor vehicle of claim 1, wherein said fields of vision include parallely disposed nontransparent means for providing a substantially unrestricted view outwardly and downwardly from the normal driver's position and a substantially restricted view inwardly from any normal position outside of the vehicle.

4. The motor vehicle of claim 2, wherein said fields of vision include parallely disposed nontransparent means for providing a substantially unrestricted view outwardly and downwardly from the normal driver's position and a substantially restricted view inwardly from any normal position outside of the vehicle.

5. A motor vehicle, comprising:
    a vehicle top having a substantially horizontal roof portion and a substantially vertical wall portion,
    said vertical wall portion including relatively small transparent window means and relatively large rigid non-transparent means to support said roof, provide a high degree of rigidity for said top and afford privacy within the vehicle,
    and means in said vertical wall portion, including window panes parallel to and spaced apart from each other and parallely disposed non-transparent means between said window panes, forming separate fields of vision in addition to said window means and separated from said window means by said relatively large rigid non-transparent means to provide a substantially unrestricted view outwardly from the normal driver's position and to provide a substantially restricted view inwardly from any normal position outside of the vehicle.

6. The motor vehicle of claim 3, wherein said parallely disposed non-transparent means comprise horizontally extending slats inclined downwardly and outwardly.

References Cited by the Examiner

UNITED STATES PATENTS

| | | | |
|---|---|---|---|
| D. 73,212 | 8/1927 | Spurges | 296—1 X |
| D. 79,563 | 10/1929 | Morton | 296—1 X |
| D. 96,860 | 9/1935 | Ryan | 296—1 X |
| 1,617,270 | 2/1927 | Paul | 296—137 X |
| 2,241,147 | 5/1941 | Maier | 296—1 |
| 2,576,354 | 11/1951 | Oswald | 296—137 |
| 2,585,322 | 2/1952 | Bradfield | 20—56.5 |
| 2,633,377 | 3/1953 | Schostal | 180—1 X |
| 2,937,047 | 5/1960 | Hezler et al. | 296—137 X |

BENJAMIN HERSH, *Primary Examiner.*

A. HARRY LEVY, *Examiner.*

C. C. PARSONS, *Assistant Examiner.*